United States Patent [19]

Daniels et al.

[11] 4,454,286

[45] Jun. 12, 1984

[54] COMPLEXES OF N-METHYLOLACRYLAMIDES WITH POLYALKOXYLATES AND POLYMERIZATION TO UNGELLED POLY(N-METHYLOLACRYLAMIDES)

[75] Inventors: Wiley E. Daniels, Easton; Dennis J. Nagy, Allentown, both of Pa.

[73] Assignee: Air Products and Chemicals, Inc., Allentown, Pa.

[21] Appl. No.: 484,061

[22] Filed: Apr. 11, 1983

Related U.S. Application Data

[62] Division of Ser. No. 303,732, Sep. 21, 1981, Pat. No. 4,393,173.

[51] Int. Cl.$^3$ ............................................. C08L 33/24
[52] U.S. Cl. ........................... 524/503; 252/351; 252/357; 252/DIG. 1; 524/555; 524/612; 524/803; 524/812; 524/827; 525/329.4
[58] Field of Search ............ 524/503, 535, 612, 803, 524/812, 827; 525/329.4; 252/351, 357, DIG. 1

[56] References Cited

U.S. PATENT DOCUMENTS

| | | | |
|---|---|---|---|
| 3,178,385 | 4/1965 | Dignes et al. | 260/29.4 |
| 3,288,740 | 11/1966 | Maeder et al. | 260/29.6 |
| 3,300,439 | 1/1967 | Chloupek et al. | 260/33.4 |
| 3,732,184 | 5/1973 | Lindemann et al. | 260/77.5 |
| 4,044,197 | 8/1977 | Wiest et al. | 526/304 |

OTHER PUBLICATIONS

F. E. Bailey, Jr. et al., Journal of Polymer Science, Part A, vol. 2, 845–851 (1964).
N. G. Gaylord in "Matrix Polymerization and the Effects of Polymers on Grafting" published in Block and Graft Copolymers, J. J. Burke and V. Weiss, Eds. Syracuse University Press, 1973, pp. 19–50.
H. Kamogawa and T. Sekiya, Journal of the Chemical Society of Japan, Industrial Chemistry Section, 63 (9), 1631–1635, Sep. 1960.

Primary Examiner—Theodore E. Pertilla
Attorney, Agent, or Firm—Michael Leach; E. Eugene Innis; James C. Simmons

[57] ABSTRACT

A composition of matter comprising (1) an N-methylol monomer of the following general formula:

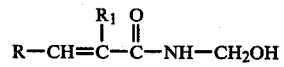

wherein R is hydrogen, lower alkyl ($C_1$–$C_4$), isopropenyl, or phenyl and $R_1$ is hydrogen or methyl, and (2) a polyalkoxylate substance having at least a portion of its structure represented by (alkylene oxide)$_x$, wherein x is an integer, the composition containing about x molecules of the N-methylol monomer per molecule of polyalkoxylated substance. Such N-methylol monomer/polyalkoxylated complexes are polymerized to yield ungelled cross-linkable N-methylol polymers. The N-methylol polymers are cross-linked in a controlled manner with polyvinyl alcohol.

20 Claims, 1 Drawing Figure

COMPLEXES OF N-METHYLOLACRYLAMIDES WITH POLYALKOXYLATES AND POLYMERIZATION TO UNGELLED POLY(N-METHYLOLACRYLAMIDES)

This is a division, of application Ser. No. 303,732, filed Sept. 21, 1981 U.S. Pat. No. 4,393,173.

TECHNICAL FIELD

The present invention relates to polymers of N-methylolacrylic, or substituted acrylic, amides. More particularly, the invention relates to stable, ungelled aqueous solutions of spontaneously cross-linkable polymers of N-methylolacrylic, or substituted acrylic, amides.

BACKGROUND OF THE INVENTION

Aqueous dispersions of spontaneously cross-linking polymers and copolymers are produced by the polymerization of acrylic or methacrylic amides in which the amide groups are substituted by methylol or methylol ether groups. The polymers and copolymers which are obtained can be converted under the action of heat or acid catalysis, or both, into cross-linked insoluble polymers. In most cases, such cross-linking occurs spontaneously leading to gelatinized products.

Aqueous solution polymerization of N-methylolacrylamide (NMA) normally results in a highly gelled, water-insoluble mass which is characteristic of the cross-linking between the highly reactive methylolhydroxyls of the N-methylolacrylamide monomer. In fact, normal solution polymerization of N-methylolacrylamide in aqueous media is virtually impossible due to the ease of condensation between the highly reactive methylols. Additionally, N-methylolacrylamide polymerizes extremely quickly into very high molecular weight polymers. Prior to the instant invention it was very difficult to produce low molecular weight poly(N-methylolacrylamide).

U.S. Pat. No. 3,178,385 discloses stable aqueous dispersions of spontaneously cross-linking polymers. The copolymers are produced by the copolymerization of a mixture of monomers comprising (1) derivatives of Mannich bases of acrylic and methacrylic amides and (2) methylol compounds of acrylic and methacrylic amides. Polyethoxylated emulsifiers are listed as suitable emulsifiers for the copolymerization reaction.

U.S. Pat. No. 3,288,740 discloses a process for the manufacture of stable copolymers of N-methylol substituted amides of acrylic acid by emulsion polymerization of the monomers in an aqueous medium wherein the polymerization is performed in the presence of a minor proportion of a water soluble alkaline earth metal salt of an alpha, beta-ethylenically unsaturated monocarboxylic acid. Stable dispersions of the copolymers are reported to result because premature cross-linking and gelatinization is avoided by this process which is carried out in the usual manner in water with the use of nonionic emulsifiers such as polyethoxylated compounds.

U.S. Pat. No. 3,300,439 discloses alkylolated acrylamide interpolymers having at least some of the amido hydrogen atoms replace by an alkylol group etherified with a polyhydric alcohol. The interpolymer ether produced in the presence of a polyhydric alcohol retains a reactive group, namely the remaining hydroxyl functionality of the polyhydric alcohol, for cross-linking cure upon baking.

U.S. Pat. No. 3,732,184 discloses a two stage polymerization of monoethylenic monomers. The monomers must include reactive monomers, such as N-methylolacrylamide, capable of thermosetting cure. Polyethoxylated octyl phenol was used as a nonionic emulsifing agent to produce a polymer latex containing a thermosetting polymer which has the capacity to cure to greater insolubility by the two stage emulsion polymerization method.

U.S. Pat. No. 4,044,197 discloses a thermally self cross-linkable ethylene/vinyl acetate copolymer containing from 2 to 10% by weight of a copolymerizable compound containing an N-methylol group. Suitable dispersing agents are the emulsifiers generally used in the emulsion polymerization including polyethylene oxide containing emulsifiers.

F. E. Bailey, Jr. et al, Journal of Polymer Science: Part A, Vol. 2, 845-851 (1964) discuss the molecular association of poly(ethylene oxide) and poly(acrylic acid) in aqueous solution.

H. Kamogawa and T. Sekiya, Journal of the Chemical Society of Japan, Industrial Chemistry Section, 63 (9), 1631–1635, September 1960, discuss the problems of aqueous polymerization of N-methylolacrylamide by $K_2S_2O_8$ and by $H_2O_2$, and of copolymerization with acrylamide.

N. G. Gaylord in "Matrix Polymerization and The Effects of Polymers on Grafting" which was published in *Block and Graft Copolymers*, J. J. Burke and V. Weiss, Eds. Syracuse University Press, 1973, p 19–50, discusses the effect of polymers on the structure and properties of monomers polymerized in their presence, a phenomenon known as "matrix polymerization."

Nevertheless, there exists a need for the ability to polymerize N-methylolacrylamide without attendant gelatinization.

There is a need for a method for producing ungelled poly(N-methylolacrylamide) of low molecular weights.

Further there is a need for a method for controlling the polymerization of N-methylolacrylamide and selectively generating a poly(N-methylolacrylamide) molecule of a desired length.

SUMMARY OF THE INVENTION

The above needs have been satisified by our invention of a new composition of matter comprising an N-methylol monomer and a polyalkoxylated substance, such as polyethoxylated or polypropoxylated polymers, and the polymerization of such compositions to yield ungelled, water soluble N-methylol polymer/polyalkoxylate complexes. We define "N-methylol monomer" for purposes of this invention as being a polymerizable amide of the acrylic acid series in which an amide hydrogen is replaced by a methylol group. "N-methylol polymer" means the polymer which results from the polymerization of an N-methylol monomer.

The new composition of matter comprises (1) an N-methylol monomer of the following general formula I:

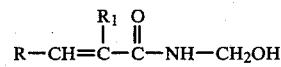

wherein R represents hydrogen, lower alkyl ($C_1$–$C_4$), isopropenyl, or phenyl radical and $R_1$ represents hydrogen or methyl radical; and (2) a polyalkoxylate having at least a portion of its structure represented by (alkylene oxide)$_x$ wherein x is an integer greater than one, preferably about 4 or greater, for example from about 4 to 500, the composition containing at least about x molecules of the N-methylol monomer per molecule of the polyalkoxylate. It is most preferred that x is an integer from about 4 to 150. It is also preferred that the composition contain about x to 2x molecules, most preferably about x molecules, of N-methylol monomer per molecule of the polyalkoxylate.

The preferred polyalkoxylate substances are polyethoxylates and polypropoxylates having at least a portion of their structure represented by the following general formula II:

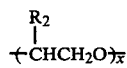
II wherein $R_2$ represents hydrogen or methyl and x is the same as defined above.

In another embodiment of the invention, the composition of matter comprises a polymer of an N-methylol monomer of the general formula I and a polyalkoxylate having at least a portion of its structure preferably represented by the general formula II wherein the polymer contains about x N-methylol monomer units per molecule of polyalkoxylate with which the polymer is associated. If the polymerization of the N-methylol monomer/polyalkoxylate complex is performed in a relatively concentrated aqueous medium, it is likely that the polymerization of the monomer will proceed across more than one complex yielding a single polymer combined with more than one polyalkoxylate molecule. In dilute concentrations polymerization will afford an N-methylol polymer having about x monomer units in association with one polyalkoxylate molecule.

The method for producing an ungelled, water soluble polymer of a N-methylol monomer comprises:

(a) mixing in an aqueous medium an N-methylol monomer of the above general formula I and a polyalkoxylate having at least a portion of its structure represented by (alkylene oxide)$_x$ in an N-methylol monomer:polyalkoxylate molar ratio of at least about x:1, and (b) polymerizing the N-methylol monomer to yield an N-methylol polymer.

Preferably the N-methylol monomer:polyalkoxylate molar ratio ranges from about x:1 to 2x:1 and most preferably is about x:1.

Without intending to be held to any particular theory, it is believed that the N-methylol monomer and the N-methylol polymer form an association complex with the polyalkoxylate substance. Accordingly, for convenience we will refer to N-methylol monomer/polyalkoxylate compositions and N-methylol polymer/polyalkoxylate compositions as association complexes.

The monomer or polymer can be separated from the monomer/- or polymer/polyalkoxylate association complex by providing a solution of the complex with another substance which has a tendency to form a stronger association bond with the oxygen atom of the alkylene oxides units, for example the ethylene oxide or propylene oxide units as the case may be, thus liberating the N-methylol monomer or polymer. Where an acidic material is used to displace the complexed N-methylol polymer by providing protons to hydrogen bond with the alkylene oxide units, the liberated N-methylol polymer would then undergo acid catalyzed self cross-linking through the methylol groups. The polymer/polyalkoxylate association complex can also be broken down by providing another polymer having cross-linking functionality, such as polyvinyl alcohol, and curing the mixture to affect the cross-linking.

An object of this invention is to provide a method for the polymerization of N-methylolacrylamides without deleterious gelation.

Another object of this invention is to provide a method for making ungelled poly(N-methylolacrylamides) of a low molecular weight.

Yet another object of the invention is to provide a method for controlling and selecting the length of poly(N-methylolacrylamides).

Another object of this invention is to provide in crystalline form N-methylol monomer/polyalkoxylate complexes.

Still another object of this invention is to provide N-methylolacrylamide/polyethoxylate complexes in a crystalline form which can be conveniently stored and measured for easy use in an aqueous polymerization reaction to afford an ungelatinized poly(N-methylolacrylamide).

It is a further object of this invention to provide an N-methylol polymer/polyalkoxylate complex which can be stored in a dry state in order to provide a ready source of ungelled N-methylol polymer for cross-linking or curing processes.

DETAILED DESCRIPTION OF THE INVENTION

Figure 1:
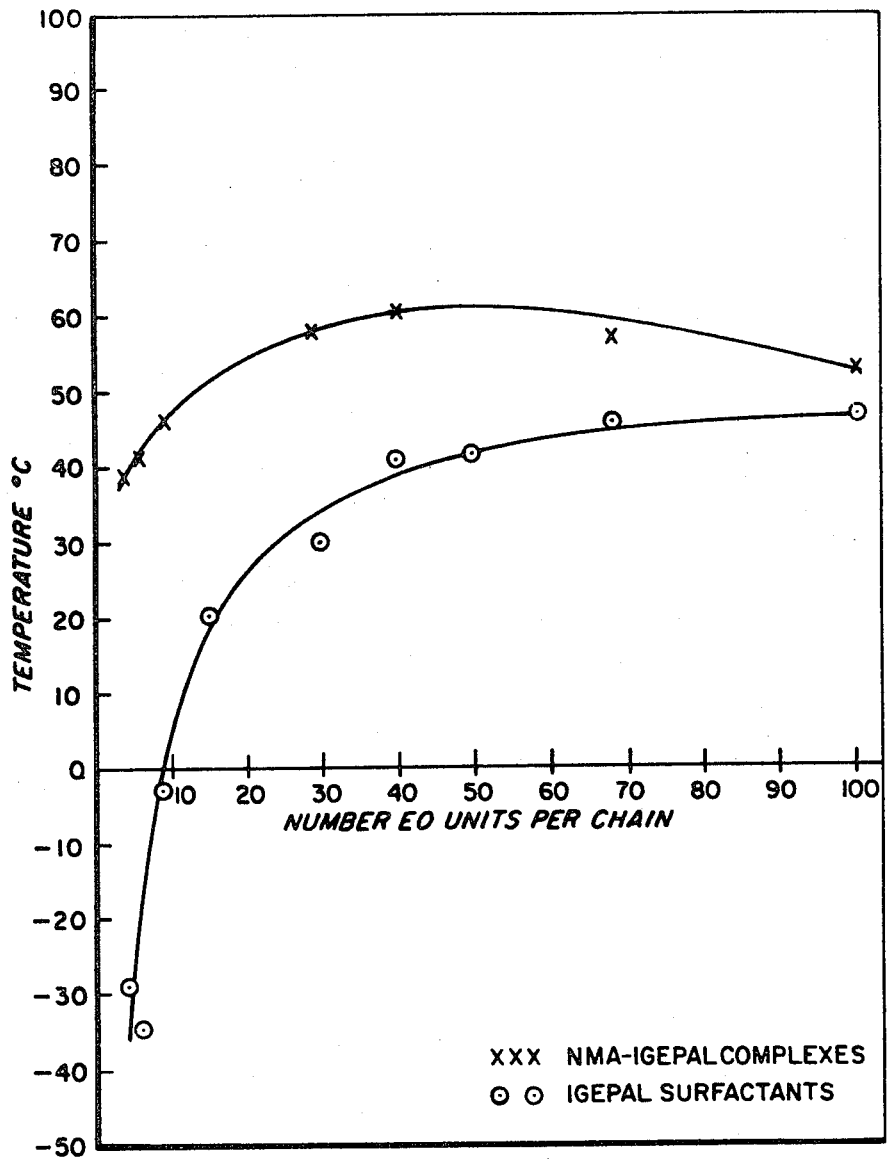
FIG. 1 is a plot of the melting points of various N-methylol monomer/polyethoxylate complexes of the invention.

The monomer/polyalkoxylate association complexes of the invention comprise an N-methylol monomer of the general formula I

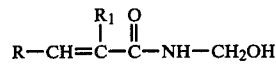
I wherein R is hydrogen, lower alkyl ($C_1$–$C_4$), isopropenyl, or phenyl radical and $R_1$ is hydrogen or methyl radical; and a compound having any number of repeating alkylene oxide units, but preferably a number of such units ranging from about 4 to 500. The complex contains at least about the same number of N-methylol monomers as there are alkylene oxide units in the polyalkoxylate substance.

The lower alkyl ($C_1$–$C_4$) group may be, for example, methyl, ethyl, n-propyl, isopropyl, n-butyl, isobutyl or t-butyl. The preferred lower alkyl group in general formula I is methyl.

Examples of N-methylol monomers of general formula I suitable for use in the complex of this invention are N-methylolacrylamide, N-methylolcrotonamide, N-methylolisocrotonamide, N-methylolmethacrylamide, N-methylolsorbamide, and N-methylolcinnamamide. N-methylolmethacrylamide and N-methylolacrylamide are the preferred monomers for use in this invention with the latter being most preferred.

The N-methylol monomers can be prepared from the appropriate alpha,beta-olefinically unsaturated monocarboxylic acid. The acid is reacted under conditions well known in the art to produce the corresponding amide which in turn is reacted with any common methylolating substance such as formaldehyde.

The polyalkoxylated substances which form a part of the complex of this invention have repeating alkylene oxide units represented by (alkylene oxide)$_x$. The preferred polyethoxylated and polypropoxylated substances have at least a portion of their structure represented by the general formula II:

$$+CHCH_2O+_x \quad \text{II}$$

wherein $R_2$ is methyl or hydrogen and x is an integer greater than one, preferably from about 4 to 500. Polyethoxylated substances are preferred.

Suitable polyethoxylated or polypropoxylated materials include, by way of example, carboxylated alcohol ethoxylates, ethoxylated alcohols, propoxylated alcohols, ethoxylated alkylphenols, ethoxylated amines and amides, ethoxylated fatty acids, propoxylated fatty acids, ethoxylated fatty esters and oils, sulfates of ethoxylated alcohols, and sulfates and sulfonates of ethoxylated alkylphenols. These compounds are all well known surfactants that are used as detergents and emulsifiers and are commercially available. It is also possible to prepare these polyethoxylated and polypropoxylated compounds by reacting a molar quantity of an alcohol, an alkylphenol, or a fatty acid, for example, with a predetermined number of moles of ethylene oxide or propylene oxide as is well known in the art.

Representative polyethoxylated substances include ethoxylated lauryl alcohol, cetyl alcohol, stearyl alcohol, oleyl alcohol, and other straight chain fatty alcohols; octylphenoxypolyethoxylate, nonylphenoxypolyethoxylate, and dibutylphenoxypolyethoxylate; ethoxylated oleyl amine, ethoxylated talo amine, ethoxylated soya amine; ethoxylated stearic acid, ethoxylated oleic acid; ethoxylated sorbitan monostearate, ethoxylated sorbitan tristearate, ethoxylated sorbitan monooleate, ethoxylated sorbitan monolaurate; and sulfated nonylphenoxypolyethoxylate.

Homopolymers of ethylene oxide and propylene oxide, and copolymers comprising ethylene oxide and propylene oxide are also suitable for practicing the invention.

In general, the N-methylol monomer/polyalkoxylate complexes are prepared by mixing the two materials in an aqueous medium. The following discussion will be presented in terms of a polyethoxylated material. It is to be understood that any reference to polyethoxylate also applies to other polyalkoxylates, particularly polypropoxylates. Either the N-methylol monomer or the polyethoxylated substance can be added to the other in an aqueous medium. The relative amounts of the monomer and polyethoxylate which are added depend upon the number of ethylene oxide units in the polyethoxylate molecules. For example, where the polyethoxylate molecule contains x number of ethylene oxide units, then for every mole of the polyethoxylate which is added to the aqueous medium there should also be added at least about x moles of N-methylol monomer. Preferably the N-methylol monomer:polyethoxylate molar ratio ranges from about x:1 to 2x:1 and most preferably is about x:1. Accordingly, each polyethoxylate molecule ideally should have an N-methylol monomer complexed with the oxygen atom of each ethylene oxide unit. The polyethoxylate molecule then acts like a template into which the N-methylol monomers fit in a stereoregular sequence. Using N-methylolacrylamide as an example, the following is believed to be an accurate portrayal of the monomer/polyethoxylate association complex:

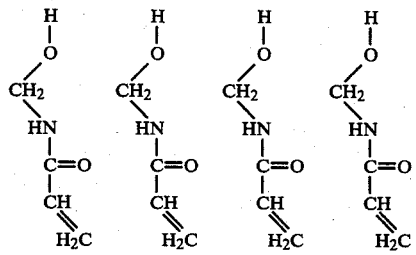

Crystalline N-methylol monomer/polyethoxylate complexes are prepared by the removal of water from the aqueous solutions of such complexes. For example, the aqueous solutions are stored in a desiccator in a dry atmosphere over fresh drying agent. Crystallized materials usually appear after several days.

Examples 1 to 12 are experiments in which various molar amounts of N-methylolacrylamide were mixed with Igepal surfactants in aqueous solution. Igepal is a trademark for nonylphenoxy poly(ethyleneoxy) ethanols sold by GAF Corporation. Table I shows the various amounts of a 48% aqueous solution of N-methylolacrylamide (NMA) which were mixed with the designated amount of the particular Igepal surfactant. The mixtures were placed in aluminum pans in a desiccator containing DRIERITE desiccant.

After about seven days, crystals appeared in Examples 2, 4 and 7. The mixtures were placed in a desiccator containing fresh DRIERITE desiccant and crystallization occurred within a couple of hours, including Examples 1, 10, 11 and 12.

TABLE I

| | | | | SURFACTANT | | NMA[b] | | MOLAR RATIO | |
|---|---|---|---|---|---|---|---|---|---|
| EXAMPLE | IGEPAL SURFACTANT | (EO)$_x$ | FORMULA WEIGHT | gm | moles | gm | moles | NMA/ SURFACTANT | COMMENTS |
| 1 | CO-430 | 4 | 396 | 4.0 | 0.01 | 8.4 | 0.04 | 4 | Highly crystalline Water soluble melting range 36–42° C. |
| 2 | CO-530 | 6 | 484 | 4.8 | 0.01 | 12.6 | 0.06 | 6 | Highly crystalline Partially water soluble melting range 38–44° C. |
| 3 | CO-530 | 6 | 484 | 4.8 | 0.01 | 6.3 | 0.03 | 3 | Soap-like crystals |
| 4 | CO-630 | 9 | 616 | 6.2 | 0.01 | 18.9 | 0.09 | 9 | Highly crystalline Water soluble |

NMA - IGEPAL SURFACTANT COMPLEXES

TABLE I-continued
NMA - IGEPAL SURFACTANT COMPLEXES

| EXAMPLE | IGEPAL SURFACTANT | $(EO)_x$ | FORMULA WEIGHT | SURFACTANT gm | moles | NMA[b] gm | moles | MOLAR RATIO NMA/SURFACTANT | COMMENTS |
|---|---|---|---|---|---|---|---|---|---|
| 5 | CO-630 | 9 | 616 | 6.2 | 0.01 | 10.5 | 0.05 | 5 | melting range 45–48° C. Partially crystalline |
| 6 | CO-630 | 9 | 616 | 6.2 | 0.01 | 2.1 | 0.01 | 1 | No crystals formed |
| 7 | CO-887[a] | 30 | 1540 | 11.0 | 0.005 | 31.5 | 0.15 | 30 | Highly crystalline Water soluble melting range 55–61° C. |
| 8 | CO-887[a] | 30 | 1540 | 11.0 | 0.005 | 15.8 | 0.075 | 15 | Partially crystalline |
| 9 | CO-887[a] | 30 | 1540 | 11.0 | 0.005 | 5.3 | 0.025 | 5 | Solid, soap-like |
| 10 | CO-897[a] | 40 | 1980 | 11.0 | 0.004 | 33.7 | 0.16 | 40 | Crystalline melting range 58–65° C. |
| 11 | CO-977[a] | 50 | 2420 | 11.0 | 0.003 | 31.6 | 0.15 | 50 | Crystalline melting range 50–63° C. |
| 12 | CO-997[a] | 100 | 4620 | 11.0 | 0.002 | 42.1 | 0.20 | 100 | Crystalline melting range 45–61° C. |

[a] 70% solution
[b] 48% solution

The information in Table I shows that those Examples in which a molar ratio of N-methylolacrylamide:polyethoxylated surfactant was about equal to the number of ethylene oxide (EO) units in the surfactant yielded crystalline material. The number (x) of EO units varied from about 4 to 100 in the various surfactants in Examples 1–12.

The N-methylolacrylamide/Igepal CO-630 surfactant complex of Example 6 showed a decreasing solubility in the following solvents in the order listed: water, acetone, tetrahydrofuran, dimethylformamide and carbon tetrachloride. The complex was also recrystallized from acetone acid, ethyl acetate, and after melting in an oven.

Melting points of the various crystalline N-methylolacrylamide (NMA) monomer/Igepal surfactant complexes listed in Table I are shown graphically in FIG. 1. A leveling off of the melting point occurs towards the higher order complexes. Also shown are the melting points for the corresponding Igepal surfactants.

No precipitation of the N-methylolacrylamide/Igepal surfactant complexes was observed for the lower order Igepal surfactants where x is less than 100. On the other hand, the N-methylolacrylamide/surfactant complex solution containing Igepal CO-997 surfactant did become hazy upon standing several hours.

The formation of crystals when the molar quantity of N-methylolacrylamide per mole of surfactant is about equal to the number of ethylene oxide units per surfactant molecule suggests a complex in which the ether oxygens are acceptor sites for the N-methylolacrylamide molecules. This conclusion seems to be supported by the fact that equivalence ratios of N-methylolacrylamide to ethylene oxide units per Igepal surfactant less than about 1:1 produce only partially crystallized structures.

While we do not wish to be bound by any particular theory, we believe that the N-methylolacrylamide/polyethoxylate complexes exist as hydrogen bonded association complexes. Infrared analysis offered a means for speculating how the hydrogen bonded association might be occurring.

Spectral shifts of various functional groups of the N-methylolacrylamide/Igepal CO-430 surfactant complex in which the N-methylolacrylamide monomer and the ethylene oxide units of the Igepal CO-430 surfactant are present in an equivalence ratio of about 1:1 are summarized in Table II. Also shown in Table II are the spectral shifts of the various functional groups of the N-methylolacrylamide/Igepal CO-630 surfactant complex having a mole ratio of monomer to surfactant of about 10:1; (i.e., an equivalence ratio of N-methylolacrylamide to ethylene oxide units of about 1.1:1). This data was compiled on a Perkin-Elmer 580BDB System, a high-energy, dispersive, ratio-recording IR spectrophotometer interfaced to a computer system.

TABLE II
IR SPECTRAL SHIFTS OF NMA COMPLEXES ($cm^{-1}$)

| BAND | IGEPAL CO-430 COMPLEX | IGEPAL CO-630 COMPLEX | SHIFT |
|---|---|---|---|
| Amide Carbonyl | 4 | 12 | Decrease |
| Aryl Ether | 22 | 19 | Decrease |
| Alkyl Ether | 36 | — | Decrease |
| Amide, 2°, Trans | 10 | 20 | Increase |

Infrared spectral shifts of usually several to a hundred wave numbers can be indicative of hydrogen bonding and whether a particular group behaves as an acceptor or a donor. It is known in the art that hydrogen bonding decreases the carbonyl stretching frequency in acceptor molecules. The amide carbonyl of the N-methylolacrylamide showed shifts of 4 and 12 $cm^{-1}$ indicating its probable role as a hydrogen bonding acceptor in the Igepal CO-430 and Igepal CO-630 surfactant complexes. The magnitude of these shifts is very similar to those seen for phenols and various other carbonyls.

The alkyl and aromatic ether oxygens of the ethylene oxide units of the Igepal CO-430 and Igepal CO-630 surfactants also show similar shifts (a decrease in wave numbers) due to an acceptor group. An almost identical shift appears for the aromatic ether oxygen of the Igepal CO-630 surfactant as compared to the Igepal CO-430 surfactant. However, the alkyl ether adsorption band is noticeably absent in the N-methylolacrylamide/Igepal CO-630 surfactant complex. This is probably due to a higher degree of hydrogen bonding in the Igepal CO-630 surfactant complex compared to the Igepal CO-430 surfactant complex in which the number of ethylene oxide units is 9 and 4, respectively. Apparently, a large degree of association by hydrogen bonding may supress the stretching frequency of the C—O—C groups. It should be noted, however, that the two N-methylolacrylamide/Igepal surfactant complexes have nearly identical shifts for the aromatic ether oxygen since only one exists for each system.

Since these spectral results were obtained from cast films of the complexes some crystallinity effects may also be contributing to spectral shifts.

Both complexes exhibited a shift of the secondary amide nitrogen in the trans state from the N-methylolacrylamide alone. This is most likely due to the amide hydrogen playing the role of a donor. Keeping in mind the role of the surfactant ether oxygens as acceptor sites, the above data enables us to postulate the following structure for the complexes:

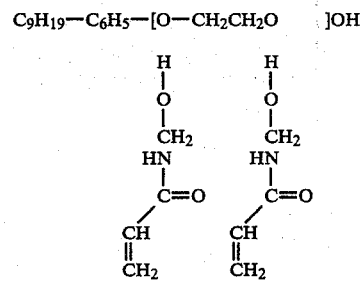

Thus, infrared analysis supports a one to one interaction between each ethylene oxide unit and N-methylolacrylamide monomer as suggested by the crystallization experiments, Examples 1–12.

In the polymerization of the N-methylol monomer/polyethoxylated surfactant complexes of this invention the surfactant acts as a template for the matrix polymerization of the N-methylol monomer. Once polymerization of the N-methylol monomer along the backbone of the polyethoxylated surfactant is complete the resulting N-methylol polymer is stable. Complexation by the hypothesized hydrogen bonding between the methylols of the polymer and the ethylene oxide units of the surfactant inhibits premature condensation and cross-linking of the methylol functions. Destruction of the N-methylol polymer/polyethoxylated surfactant complexes allows the N-methylol polymer to "peel" away from the surfactant and cross-link intermolecularly or intramolecularly. The following reaction depicts a poly(N-methylolacrylamide)/polyethoxylated surfactant complex breaking down during a curing process to generate intramolecularly cross-linked poly(N-methylolacrylamide) and the liberated polyethoxylated surfactant. Water is generated during the cross linking reaction. If another source of hydroxyl groups, such as polyvinyl alcohol, is present during the curing process, intermolecular cross-linking would occur between the N-methylol polymer and the polyvinyl alcohol.

aqueous medium by the delayed addition of the monomer/surfactant complex to an initial charge in a reaction vessel or by delayed addition of the N-methylol monomer to an initial charge containing the polyethoxylated surfactant. Post addition to the polymerization reaction medium of a water miscible organic solvent which is a nonsolvent for the N-methylol polymer/surfactant complex, followed by collection of the precipitate and drying, affords a solid product.

When reference is made to "delay" additions, substantially uniform incremental additions, both with respect to time and quantity, are intended.

The polymerization reaction is carried out at an initial pH of about 3.5 or higher. In a more acidic environment the N-methylol monomer/polyethoxylated surfactant complex may break down and lead to cross-linking during the polymerization reaction. It is preferred that the polymerization be carried out at an initial pH of between 5 and 7. In order to maintain the pH range, it may be useful to work in the presence of customary buffer systems, for example, in the presence of alkali metal acetates, alkali metal carbonates, alkali metal phosphates and the like.

The temperature of the polymerization reaction should be between 35° to 75° C. and preferably between about 50° to 60° C. A reaction temperature of about 55° C. is most preferred.

To an initial charge comprising deionized (DI) water in a reaction vessel is added an activator delay, an N-methylol monomer delay and an initiator delay. The activator delay is an aqueous solution of the typical redox catalysts and is added in such amounts so as to maintain the polymerization reaction temperature. Suitable redox catalysts for use in the polymerization reaction are sodium formaldehyde sulfoxylate, iron (II) salts, sodium dithionite, sodium sulfite, sodium thiosulfate and the like. Advantageously, a trace of ferrous sulfate is added to the aqueous initial charge. The preferred activator delay used in the following examples comprises an aqueous solution of sodium acetate and sodium formaldehyde sulfoxylate (SFS).

As previously stated, the N-methylol monomer delay may comprise an aqueous solution of the N-methylol monomer and the polyethoxylated surfactant in the correct proportions or the delay may simply comprise an aqueous solution of the N-methylol monomer, the polyethoxylated surfactant being included in the initial charge to the reaction vessel. Of course, the N-methylol monomer/polyethoxylate complex solids, previously prepared and isolated, may be used to make the aqueous delay solution.

Suitable as polymerization catalysts composing the initiator are the water soluble free-radical-formers gen-

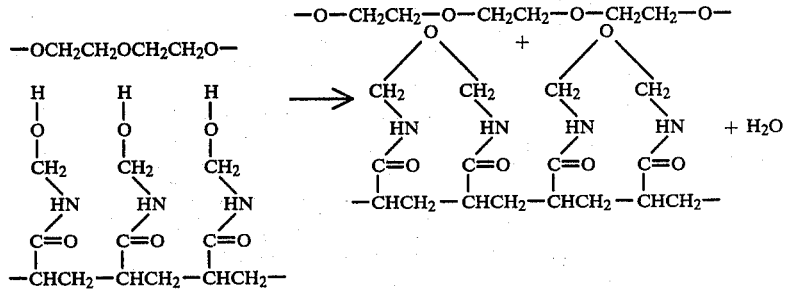

In general, the N-methylol monomer/polyethoxylated surfactant complexes can be polymerized in an erally used in polymerization, such as hydrogen peroxide, and tertiary butyl hydroperoxide (t-BHP) in amounts necessary to maintain a constant polymerization reaction as is well known in the art. The commonly used persulfate polymerization catalysts should be avoided since they tend to produce highly acidic species in aqueous solution which could lead to gelatinized products.

The polymerization procedure comprises heating the initial charge to a temperature between about 35° to 75° C. and maintaining it at that temperature. The activator and monomer delays are then added simultaneously to the initial charge. The initiator, if not included as a part of the initial charge, is added as a delay to the reaction vessel as needed to maintain a constant temperature. The activator delay is added over the period of the reaction as needed to sustain the reaction. The entire monomer delay is charged to the reaction vessel over a period of about one to two hours.

Examples 13–28 are runs involving the polymerization of N-methylolacrylamide/nonylphenol polyethoxylate surfactant complexes in which the surfactant template chain length varies from 4 to 150 ethylene oxide units.

In most of the following Examples the monomer delay and the activator delay were added simultaneously to a reaction vessel which was equipped with a stirrer operating at about 150 RPM. In addition, the reaction vessel was equipped with a constant temperature water jacket at about 50° C. Data for each Example are presented in Table III. Alipal and Igepal are trademarks for surfactants marketed by GAF Corporation.

EXAMPLE 13

| | gm | | gm |
|---|---|---|---|
| INITIAL CHARGE | | NMA DELAY | |
| DI water | 350.0 | NMA | 78.1 |
| Alipal CO-433 (28%) | 1.5 | Igepal CO-630 | 25.4 |
| Ferrous Sulfate | trace | DI water | 96.5 |
| ACTIVATOR DELAY | | INITIATOR DELAY | |
| DI water | 160.0 | t-BHP (70% solution) | 3.0 |
| SFS | 9.0 | | |
| Sodium acetate | 3.4 | | |

The pH of the initial charge was adjusted to 3.5 with 50% phosphoric acid. When the reaction medium had achieved a temperature of 50° C., the addition of the NMA monomer delay and the activator delay was commenced. The entire amount of the monomer delay was added over a period of 2.75 hours and in that time 104 ml of the activator delay had also been added. The initiator delay was added as needed to maintain reaction temperature.

EXAMPLE 14

| | gm | | gm |
|---|---|---|---|
| INITIAL CHARGE | | INITIATOR DELAY | |
| DI water | 300.0 | t-BHP (70%) | as required |
| Alipal CO-433 (28%) | 1.5 | | |
| NMA (48%) | 234.0 | | |
| Igepal CO-630 | 76.2 | | |
| Ferrous sulfate | trace | | |
| ACTIVATOR DELAY | | | |
| DI water | 160.0 | | |
| SFS | 9.0 | | |
| Sodium acetate | 3.4 | | |

The activator delay and initiator delay were added as required to maintain an exothermic reaction. The pH of the initial charge was adjusted to 3.5 with 50% phosphoric acid. The NMA/Igepal CO-630 complex was part of the initial charge. The solution gelled immediately upon the addition of approximately 4 drops of the initiator delay and approximately 1 ml of activator delay. In Example 13, the complex solution was added as a delay to the initial charge which had also been adjusted to pH 3.5, and such procedure permitted polymerization to occur without producing a gelled material.

EXAMPLE 14a

| | gm | | gm |
|---|---|---|---|
| INITIAL CHARGE | | ACTIVATOR DELAY | |
| DI water | 449.1 | DI water | 80.0 |
| Igepal CO-630 | 22.9 | SFS | 4.5 |
| NMA (48%) | 78.1 | Sodium acetate | 1.7 |
| Ferrous sulfate | trace | | |
| t-BHP (70%) | 0.5 | | |
| INITIATOR DELAY | | | |
| t-BHP (70%) | 3.0 | | |
| DI water | 3.0 | | |

Since Example 14 yielded a gelled product, another run in which the N-methylolacrylamide/Igepal CO-630 complex was present in the initial charge was performed using the above charge and delays. The initial pH was adjusted to 3.5 with 50% phosphoric acid. This run yielded an ungelled product solution.

EXAMPLE 14b

This run was a repeat of Example 14a in which the initial pH was adjusted to 6.0. Surprisingly, this reaction gelled during the run.

EXAMPLE 15

| | gm | | gm |
|---|---|---|---|
| INITIAL CHARGE | | NMA DELAY | |
| DI water | 300.0 | NMA (48%) | 234.0 |
| Alipal CO-433 | 1.5 | Igepal CO-630 | 76.2 |
| Ferrous sulfate | trace | | |
| ACTIVATOR DELAY | | INITIATOR DELAY | |
| DI water | 160.0 | t-BHP (70%) | as required |
| SFS | 9.0 | | |
| Sodium acetate | 3.4 | | |

The initial charge was adjusted to pH 3.5 with 50% phosphoric acid. The activator delay and initiator delay were added as required to maintain an exothermic reaction. The stirrer was operated at about 150 to 180 RPM and the reaction temperature was about 50°. The NMA delay (280 ml) and the activator delay (50 ml) were added over a period of about 1.75 hours. This run was a repeat of Example 14 using the complex delay addition. The viscosity of the resultant solution was 195 cps.

EXAMPLE 16

| INITIAL CHARGE | gm | NMA DELAY | gm |
|---|---|---|---|
| DI water | 300.0 | NMA (48%) | 234.0 |
| Igepal CO-630 | 76.2 | | |
| Ferrous sulfate | trace | | |
| ACTIVATOR DELAY | | INITIATOR DELAY | |
| DI water | 160.0 | t-BHP (70%) | 9 |
| SFS | 9.0 | | |
| Sodium acetate | 3.4 | | |

The pH of the initial charge was adjusted 3.5 with 50% phosphoric acid and was stirred at 150 RPM. The reaction medium was maintained at a temperature of about 50° C. The initiator delay was added at a slow steady rate as required. The NMR delay and the activator delay (42 ml) were added over a period of about one hour. Fifteen minutes after the initial introduction of the delays, stirring was increased to 160 RPM and 15 minutes later was increased to 180 RPM for the remainder of the reaction. The reaction product was a stable solution having a viscosity of 330 cps.

EXAMPLE 17

| INITIAL CHARGE | gm | NMA DELAY | gm |
|---|---|---|---|
| DI water | 300.0 | NMA (48%) | 234.0 |
| Alipal CO-433 (28%) | 1.5 | Igepal CO-630 | 76.2 |
| ACTIVATOR DELAY | | | |
| Sodium persulfate in water | | | |
| (1 part sodium persulfate | | | |
| to 16 parts water) | | | |

The temperature of the polymerization medium was about 65° C. and the sodium persulfate activator delay was added as needed at a slow steady rate. After the reaction medium had been brought to about 65° C., a portion of the NMA delay (80 ml) and a portion of the activator delay (12 ml) were added within the next 15 minutes. Within 5 minutes of these additions the solution gelled. It is believed that the sodium persulfate, which is known to generate a bisulfate anion in polymerization reactions, created an environment which may have been too acidic for the proposed hydrogen bonded association complex to exist. Under such conditions, the polymerization reaction would occur with the uncomplexed N-methylolacrylamide monomer and result in a gelled product.

EXAMPLE 18

| INITIAL CHARGE | gm | NMA DELAY | gm |
|---|---|---|---|
| DI water | 300.0 | NMA (48%) | 78.1 |
| Ferrous sulfate | trace | Alipal CO-433 (28%) | 150.0 |
| ACTIVATOR DELAY | | INITIATOR DELAY | |
| DI water | 160.0 | t-BHP (70%) | as |
| SFS | 9.0 | | required |
| Sodium acetate | 3.4 | | |

The pH of the initial charge was 5.55 and was not adjusted. The initiator delay was added separately at a slow rate to the reaction medium which was maintained at about 50° C. The NMA delay (200 ml) and the activator delay (48 ml) were added over one hour and five minutes. The resulting slightly yellow solution was stable and possessed a viscosity of 7.5 cps and a pH of 5.72.

EXAMPLE 19

| INITIAL CHARGE | gm | NMA DELAY | gm |
|---|---|---|---|
| DI water | 300.0 | NMA (48%) | 156.0 |
| Igepal CO-430 | 42.0 | Alipal CO-433 | 150.0 |
| Ferrous sulfate | trace | | |
| ACTIVATOR DELAY | | INITIATOR DELAY | |
| DI water | 160.0 | t-BHP (70%) | 3.0 |
| SFS | 9.0 | | |
| Sodium acetate | 3.4 | | |

The pH of the initial charge was 3.60 unadjusted and the reaction medium temperature was maintained at about 50° C. The NMA delay (260 ml) and the activator delay (62 ml) were added over one hour and twenty minutes. The stirrer which was operated initially at 180 RPM was increased to 200 RPM fifteen minutes after the first additions of NMA delay and activator delay because the reaction medium was becoming thick. After another five minutes, the stirrer was increased to 220 RPM. The final product was a milky white viscous solution having a viscosity of 650 cps and a pH of 5.35.

EXAMPLE 20

| INITIAL CHARGE | gm | 24 NMA DELAY | gm |
|---|---|---|---|
| DI water | 300.0 | NMA (48%) | 156.0 |
| Igepal CO-430 | 42.0 | DI water | 42.0 |
| Ferrous sulfate | trace | | |
| ACTIVATOR DELAY | | INITIATOR DELAY | |
| DI water | 160.0 | t-BHP (70%) | 4.0 |
| SFS | 9.0 | | |
| Sodium acetate | 3.4 | | |

The initial charge, which must be brought up to the temperature of about 50° C. slowly in order to prevent it from seriously lumping up, had a pH of 4.29 which was unadjusted. The stirrer was maintained at a constant 180 RPM. The NMA delay (180 ml) and the activator delay (34 ml) were added over a 40 minute period. The resulting liquid medium was full of small lumps. The lumping in this run was probably due to the initial charge containing Igepal CO-430 surfactant which is an oil-soluble surfactant.

EXAMPLE 21

| INITIAL CHARGE | gm | NMA DELAY | gm |
|---|---|---|---|
| DI water | 500.0 | NMA (48%) | 156.0 |
| Igepal CO-430 | 42.0 | DI water | 42.0 |
| Ferrous sulfate | trace | | |
| Alipal CO-433 (28%) | 150.0 | | |
| ACTIVATOR DELAY | | INITIATOR DELAY | |
| DI water | 160.0 | t-BHP (70%) | 4.5 |
| SFS | 9.0 | | |
| Sodium acetate | 3.4 | | |

The pH of the initial charge was 7.91 and was not adjusted. The reaction medium was maintained at about 50° C. with the stirrer operated at 180 RPM. The NMA delay (180 ml) and the activator delay (32 ml) were added over a 38 minute period. Lumping again was evident as in Example 20, probably due to oil-soluble Igepal CO-430 surfactant.

EXAMPLE 22

| INITIAL CHARGE | gm | NMA DELAY | gm |
|---|---|---|---|
| DI water | 500.0 | NMA (48%) | 300.0 |
| Igepal CO-630 | 48.9 | | |
| Alepal CO-433 (28%) | 150.0 | | |
| Ferrous sulfate | trace | | |
| ACTIVATOR DELAY | | INITIATOR DELAY | |
| DI water | 160.0 | t-BHP (70%) | 4.5 |
| SFS | 9.0 | | |
| Sodium acetate | 3.4 | | |

The initial charge had a pH of 7.56 unadjusted. The stirrer was operated over a range of 150–200 RPM. The NMA delay (260 ml) and the activator delay (40 ml) were added over a 52 minute period. The yellowish resulting solution was stable and had a small amount of a slight dark precipitate. The viscosity was 240 cps. Post addition of acetone to the finished reaction solution yielded a significant white precipitate which was collected and dried.

EXAMPLE 23

| INITIAL CHARGE | gm | NMA DELAY | gm |
|---|---|---|---|
| DI water | 500.0 | NMA (48%) | 78.0 |
| Triton X-301 (20%) | 210.0 | | |
| Ferrous sulfate | trace | | |
| t-BHP | 1.0 | | |
| ACTIVATOR DELAY | | INITIATOR DELAY | |
| DI water | 80.0 | t-BHP (70%) | 4.0 |
| SFS | 4.5 | | |
| Sodium acetate | 1.7 | | |

The NMA delay was added at a slow steady rate to the initial charge which had a pH of 6.35 and was maintained at about 50° C. THE NMA delay and the activator delay (30 ml) were completely added within 45 minutes. The stirrer was at 150 RPM at the commencement of the delayed additions and was increased to 180 RPM after 15 minutes. The resulting solution was a stable milky white liquid having a viscosity of 32 cps. Again, a water insoluble product resulted from using a polyethoxylated surfactant that was not completely water soluble having only 4 ethylene oxide units per molecule. Post addition of acetone facilitated precipitation of the product which was collected and dried.

EXAMPLE 24

| INITIAL CHARGE | gm | NMA DELAY | gm |
|---|---|---|---|
| DI water | 300.0 | NMA (48%) | 156.3 |
| Ferrous sulfate | trace | Igepal CO-887 (70%) | 27.2 |
| ACTIVATOR DELAY | | INITIATOR DELAY | |
| DI water | 80.0 | t-BHP (70%) | as required |
| SFS | 4.5 | | |
| Sodium acetate | 1.7 | | |

The pH of the initial charge was 4.96 unadjusted and the reaction medium was maintained at about 50° C. The NMA delay (150 ml) and the activator delay (24 ml) were added over a 27 minute period. The resulting yellowish solution was stable and had a slight precipitate.

EXAMPLE 25

| INITIAL CHARGE | gm | NMA DELAY | gm |
|---|---|---|---|
| DI water | 300.0 | NMA (48%) | 234.0 |
| Ferrous sulfate | trace | DI water | 50.0 |
| | | Igepal CO-997 | 51.4 |
| ACTIVATOR DELAY | | INITIATOR DELAY | |
| DI water | 160.0 | t-BHP (70%) | 2.5 |
| SFS | 9.0 | | |
| Sodium acetate | 3.4 | | |

The reaction medium was maintained at about 53°–55° C. The NMA delay and the activator delay (60 ml) were added over a period of 1 hour. The resulting solution was stable and contained a small amount of a dark yellow precipitate.

EXAMPLE 26

| INITIAL CHARGE | gm | NMA DELAY | gm |
|---|---|---|---|
| DI water | 300.0 | DI water | 50.0 |
| Ferrous sulfate | trace | Igepal CO-977 (70%) | 76.9 |
| | | NMA (48%) | 234.0 |
| ACTIVATOR DELAY | | INITIATOR DELAY | |
| DI water | 160.0 | t-BHP (70%) | 3.0 |
| SFS | 9.0 | | |
| Sodium acetate | 3.4 | | |

With the reaction medium maintained at about 55° C. the NMA delay and the activator delay (62 ml) were added over a period of 1 hour. The very viscous resulting solution began to gel about 30 minutes after cooling.

EXAMPLE 27

| INITIAL CHARGE | gm | NMA DELAY | gm |
|---|---|---|---|
| DI water | 300.0 | NMA (48%) | 234.0 |
| Ferrous sulfate | trace | Igepal DM-970 | 51.5 |
| | | DI water | 50.0 |
| ACTIVATOR DELAY | | INITIATOR DELAY | |
| DI water | 80.0 | t-BHP (70%) | 3.0 |
| SFS | 4.5 | | |
| Sodium acetate | 1.7 | | |

The reaction medium was maintained at about 55° C. for the polymerization reaction. The NMA delay and the activator delay (50 ml) were added over a 1 hour period. The resulting solution was very stable and had only a slight precipitate.

EXAMPLE 28

| INITIAL CHARGE | gm | NMA DELAY | gm |
|---|---|---|---|
| DI water | 200.0 | NMA (48%) | 156.3 |
| Acetone | 100.0 | Igepal CO-887 (70%) | 27.2 |
| Ferrous sulfate | trace | | |
| ACTIVATOR DELAY | | INITIATOR DELAY | |
| DI water | 160.0 | t-BHP (70%) | as required |
| SFS | 9.0 | | |
| Sodium acetate | 3.4 | | |

The NMA delay and the activator delay (24 ml) were added over a 35 minute period. The reaction which commenced at about 51° C. rose to about 57° C. after about 30 minutes. This reaction was more exothermic then those carried out in water only.

ability to serve as a template for more than one equivalent of N-methylol monomer per ethylene oxide unit.

The poly(N-methylolacrylamide)/polyethoxylate surfactant complex can be used as a cross-linking agent. Previously it was not possible to use the polymerization

TABLE III

HOMOPOLYMERIZATIONS OF NMA USING IGEPAL SURFACTANTS

| EXAMPLE | IGEPAL SURFACTANT | (EO)$_x$ | SURFACTANT gm | SURFACTANT moles | NMA gm | NMA moles | MOLAR RATIO NMA/SURFACTANT | COMPLEX DELAY | NMA ONLY DELAY | GELATION |
|---|---|---|---|---|---|---|---|---|---|---|
| 13 | CO-630 | 9 | 25.4 | 0.04 | 37.5 | 0.37 | 9.1 | YES | NO | NO |
| 14 | CO-630 | 9 | 76.2 | 0.12 | 112 | 1.11 | 9.0 | NO | NO | YES |
| 14a | CO-630 | 9 | 22.9 | 0.037 | 37.5 | 0.37 | 10.0 | NO | NO | NO |
| 14b | CO-630 | 9 | 22.9 | 0.037 | 37.5 | 0.37 | 10.0 | NO | NO | YES |
| 15 | CO-630 | 9 | 76.2 | 0.12 | 112 | 1.11 | 9.3 | YES | NO | NO |
| 16 | CO-630 | 9 | 76.2 | 0.12 | 112 | 1.11 | 9.3 | NO | YES | NO |
| 17 | CO-630 | 9 | 76.2 | 0.12 | 112 | 1.11 | 9.3 | YES | NO | YES |
| 18 | Alipal CO-433 | 4 | 42 | 0.084 | 37.5 | 0.37 | 4.4 | YES | NO | NO |
| 19 | Alipal CO-433 | 4 | 42 | 0.084 | | | | | | |
| | | | | | 74.9 | 0.74 | 3.9 | PARTIALLY | NO | NO |
| | CO-430 | 4 | 42 | 0.106 | | | | | | |
| 20 | CO-430 | 4 | 42 | 0.106 | 74.9 | 0.74 | 7.0 | NO | YES | LUMPING |
| 21 | Alipal CO-433 | 4 | 42 | 0.084 | | | | | | |
| | | | | | 74.9 | 0.74 | 4.4 | NO | YES | LUMPING |
| | CO-430 | 4 | 42 | 0.106 | | | | | | |
| 22 | Alipal CO-433 | 4 | 42 | 0.084 | | | | | | |
| | | | | | 144 | 1.43 | 8.8 | NO | YES | NO |
| | CO-630 | 9 | 48.9 | 0.079 | | | | | | |
| 23 | Triton X-301 | 4 | 42.0 | 0.095 | 37.4 | 0.37 | 3.9 | NO | YES | NO |
| 24 | CO-887 | 30 | 19.0 | 0.0123 | 75.0 | 0.74 | 60 | YES | NO | NO |
| 25 | CO-997 | 100 | 36.0 | 0.0078 | 112.3 | 1.11 | 142 | YES | NO | NO |
| 26 | CO-977 | 50 | 53.8 | 0.022 | 112.3 | 1.11 | 51 | YES | NO | NO* |
| 27 | DM-970 | 150 | 51.5 | 0.0074 | 112.3 | 1.11 | 150 | YES | NO | NO |
| 28 | CO-887 | 30 | 19.0 | 0.0123 | 75.0 | 0.74 | 60 | YES | NO | NO |

*Began to gel about 30 minutes after cooling

Table III shows the number of ethylene oxide units in the polyethoxylated surfactant and the number of moles of the surfactant and N-methylol monomer for Examples 13–28. Also listed is the molar ratio of N-methylol monomer equivalents per surfactant equivalents.

As can be seen from the above examples and from the data in Table III, a method is now available for producing an ungelled water soluble homopolymer of N-methylol monomers, in particular homopolymers of N-methylolacrylamide. By the use of two or more N-methylol monomers, ungelled copolymers may be prepared. It is also evident that the molecular weight or the length of the homopolymer can be controlled by the selection of a polyethoxylated surfactant having a predetermined number of ethylene oxide units. By adding about one equivalent of the N-methylol monomer for every ethylene oxide unit in the surfactant, the polymerization of the N-methylol monomer proceeds without premature cross-linking. When a polyethoxylated surfactant contains only about 4 ethylene oxide units per molecule and is substantially water insoluble, it would be advantageous to add a water miscible organic solvent such as acetone to produce a homogeneous polymerization reaction medium.

Examples 24 and 28 show that the addition of about 2 equivalents of N-methylolacrylamide for each ethylene oxide unit of the surfactant molecule leads to a stable aqueous solution of the homopolymer/surfactant complex. Example 25 used about 1.4 equivalents of N-methylolacrylamide and also produced a stable product. Apparently the polyethoxylated surfactant has the product of N-methylolacrylamide as a cross-linking agent since it would have spontaneously self cross-linked to yield a gelatinous material. By heat curing a polyvinyl alcohol film with a poly(N-methylolacrylamide)/polyethoxylate complex, the association complex breaks apart and cross-links through condensation of the methylol hydroxyls and the hydroxyls of the polyvinyl alcohol. Examples 29 and 30 demonstrate this cross-linking.

EXAMPLE 29

Film 1 was cast from a 5% solution of Vinol 205 polyvinyl alcohol. Vinol 205 is a partially hydrolyzed low molecular weight polyvinyl alcohol marketed by Air Products and Chemicals, Inc. Film 2 was cast from a 5% solution of Vinol 205 polyvinyl alcohol plus the poly(N-methylolacrylamide)/polyethoxylated surfactant complex of Example 15. Both films were dried and heated in an oven at 150° C. for twenty minutes. Upon addition to water, film 1 solubilized very slowly and film 2 remained on the surface and immediately swelled. After partially remaining as a swollen globule in water, it finally dissolved.

EXAMPLE 30

The following three samples were prepared:
Sample A: 12.5 grams of Vinol 205 polyvinyl alcohol in 300 ml of water (4.2%)
Sample B: 50 ml of sample A plus 3 ml of a 25% aqueous solution of sodium hydrogen sulfate (1.5% sodium hydrogen sulfate by weight)

Sample C: 50 ml of sample A, 3 ml of 25% aqueous sodium hydrogen sulfate and 5 ml of the complex of Example 15 (27.3% solids)

Films of samples A, B and C were dried on Teflon plates. Pieces of each film were added to water at room temperature. Samples A and B dissolved. Sample C was insoluble; however, the film curled up and turned white.

Pieces of each film were placed in a 150° C. oven for about 8 minutes and then in water. Samples A and B dissolved in a couple of minutes. Samples C was insoluble. The film turned white but did not curl, suggesting that it was highly insoluble in water and that the poly(N-methylolacrylamide) cross-linked with and insolublized the polyvinyl alcohol.

Therefore, cross-linking polyvinyl alcohol by the use of the ungelled poly(N-methylolacrylamide)/polyethoxylated surfactant complexes of this invention affords insoluble non-swelling films and can be used to make water insensitive polyvinyl alcohol adhesives.

STATEMENT OF INDUSTRIAL APPLICATION

The N-methylol monomer/polyalkoxylate compositions of this invention provide a means for obtaining ungelled N-methylol polymer in the form of N-methylol polymer/polyalkoxylate compositions, which can be used to cross-link and insolubilize polyvinyl alcohol, thus affording water insensitive polyvinyl alcohol adhesives.

What is claimed is:

1. A method for preparing a composition of matter which comprises mixing in an aqueous medium an N-methylol monomer of the general formula:

$$\underset{R-CH=C-C-NH-CH_2OH}{\overset{R_1\ \ \ O}{|\ \ \ \ \ \ ||}}$$

wherein R is hydrogen, lower alkyl ($C_1$-$C_4$), isopropenyl or phenyl radical and $R_1$ is hydrogen or methyl radical, and a polyalkoxylate having at least a portion of its structure represented by (alkylene oxide)$_x$ wherein x is an integer greater than one, in an N-methylol monomer:polyalkoxylate molar ratio of at least about x:1.

2. A method for producing a polymer of an N-methylol monomer of the general formula:

$$\underset{R-CH=C-C-NH-CH_2OH}{\overset{R_1\ \ \ O}{|\ \ \ \ \ \ ||}}$$

wherein R is hydrogen, lower alkyl ($C_1$-$C_4$), isopropenyl or phenyl radical and $R_1$ is hydrogen or methyl radical, which method comprises:

(a) mixing in an aqueous medium an N-methylol monomer of the above formula and a polyalkoxylate substance having at least a portion of its structure represented by (alkylene oxide)$_x$, wherein x is an integer greater than one, in an N-methylol monomer:polyalkoxylate molar ratio of at least about x:1, and (b) polymerizing the N-methylol monomer to yield an N-methylol polymer.

3. The method of claim 1 in which the polyalkoxylate substance is a polyethoxylate or polypropoxylate having at least a portion of its structure represented by the formula:

$$-(-CHCH_2O-)_{\overline{x}}^{\overset{R_2}{|}}$$

wherein $R_2$ is hydrogen or methyl.

4. The method of claim 3 in which the N-methylol monomer:polyalkoxylate molar ratio is from about x:1 to 2x:1.

5. The method of claim 3 in which x is from about 4 to 500.

6. The method of claim 3 in which x is from about 4 to 150.

7. The method of claim 3 in which the N-methylol monomer is N-methylolacrylamide.

8. The method of claim 7 in which the polyalkoxylate is a polyethoxylated substance.

9. The method of claim 8 in which the N-methylol monomer:polyethoxylate molar ratio is about x:1.

10. The method of claim 9 in which the polyethoxylated substance is a polyethoxylated alkylphenol.

11. The method of claim 2 in which the polyalkoxylated substance is a polyethoxylate or polypropoxylate having at least a portion of its structure represented by the formula:

$$-(-CHCH_2O-)_{\overline{x}}^{\overset{R_2}{|}}$$

wherein $R_2$ is hydrogen or methyl.

12. The method of claim 11 in which the N-methylol monomer:polyalkoxylate molar ratio is from about x:1 to 2x:1.

13. The method of claim 11 in which x is from about 4 to 500.

14. The method of claim 11 in which x is from about 4 to 150.

15. The method of claim 11 in which the N-methylol monomer is N-methylolacrylamide.

16. The method of claim 15 in which the polyalkoxylate is a polyethoxylated substance.

17. The method of claim 16 in which the N-methylol monomer:polyethoxylate molar ratio is about x:1.

18. The method of claim 17 in which the polyethoxylated substance is a polyethoxylated alkylphenol.

19. The method of claim 2 which includes the step of cross-linking the polymer from step (b) with a second polymer having cross-linking functionality.

20. The method of claim 19 in which the second polymer having cross-linking functionality is polyvinyl alcohol.

* * * * *